United States Patent
Song et al.

(10) Patent No.: US 10,625,564 B2
(45) Date of Patent: Apr. 21, 2020

(54) OUTDOOR HEAT EXCHANGER

(71) Applicant: Hanon Systems, Daejeon (KR)

(72) Inventors: Jun Young Song, Daejeon (KR); Hong-Young Lim, Daejeon (KR); Kwang Hun Oh, Daejeon (KR)

(73) Assignee: HANON SYSTEMS, Daejeon (KR)

(*) Notice: Subject to any disclaimer, the term of this patent is extended or adjusted under 35 U.S.C. 154(b) by 60 days.

(21) Appl. No.: 15/109,477

(22) PCT Filed: Apr. 30, 2015

(86) PCT No.: PCT/KR2015/004390
§ 371 (c)(1),
(2) Date: Jul. 1, 2016

(87) PCT Pub. No.: WO2015/178596
PCT Pub. Date: Nov. 26, 2015

(65) Prior Publication Data
US 2017/0057320 A1    Mar. 2, 2017

(30) Foreign Application Priority Data

May 19, 2014 (KR) .................. 10-2014-0059852

(51) Int. Cl.
*B60H 1/00* (2006.01)
*F28F 9/013* (2006.01)
(Continued)

(52) U.S. Cl.
CPC ......... *B60H 1/00335* (2013.01); *F25B 13/00* (2013.01); *F25B 39/04* (2013.01);
(Continued)

(58) Field of Classification Search
CPC ........ F25B 2339/044; F25B 2339/0446; F28F 9/0263; F28F 9/0207; F28F 9/0209
See application file for complete search history.

(56) References Cited

U.S. PATENT DOCUMENTS 5,190,100 A * 3/1993 Hoshino .................. B21C 37/22
                                                   165/110
5,806,587 A * 9/1998 Sasaki .................... F28F 9/0207
                                                   165/174
(Continued)

FOREIGN PATENT DOCUMENTS

JP    2002031494 A *  1/2002 ............. F25B 39/04
JP    2005300072 A    10/2005
(Continued)

OTHER PUBLICATIONS

English Translation of JP2002031494A.*

*Primary Examiner* — Marc E Norman
*Assistant Examiner* — Schyler S Sanks
(74) *Attorney, Agent, or Firm* — Shumaker, Loop & Kendrick, LLP; James D. Miller (57) ABSTRACT

The present invention relates to an outdoor heat exchanger, and more particularly, to a down flow type outdoor heat exchanger having channels of at least three paths in a heat pump system for vehicles, in which a flux distribution means protruded in a height direction is further formed in a lower tank in which the channel is changed from an upward direction to a downward direction or from a downward direction to an upward direction to block some area of a lower portion thereof so as to prevent a refrigerant from being non-uniformly distributed while a flux is concentrated toward a rear side of the channel due to a fluid inertia in an area in which the flow path is changed, thereby delaying frosting upon heating.

17 Claims, 9 Drawing Sheets

(51) Int. Cl.
*F25B 39/04* (2006.01)
*F25B 13/00* (2006.01)
*F25B 5/04* (2006.01)
*F25B 40/00* (2006.01)
*F25B 6/04* (2006.01)

(52) U.S. Cl.
CPC ............... *F28F 9/013* (2013.01); *F25B 5/04* (2013.01); *F25B 6/04* (2013.01); *F25B 40/00* (2013.01); *F25B 2339/044* (2013.01); *F25B 2341/0662* (2013.01); *F25B 2400/0409* (2013.01); *F25B 2400/0411* (2013.01)

(56) References Cited

U.S. PATENT DOCUMENTS

| | | | |
|---|---|---|---|
| 9,464,850 B2* | 10/2016 | Iino | F28D 1/05375 |
| 9,574,806 B2* | 2/2017 | Inoue | F25B 13/00 |
| 2005/0126764 A1* | 6/2005 | Alinovi | F25B 39/04 |
| | | | 165/119 |
| 2006/0179876 A1* | 8/2006 | Yagisawa | F25B 39/02 |
| | | | 62/515 |
| 2011/0220336 A1* | 9/2011 | Saito | F28D 1/05391 |
| | | | 165/173 |
| 2016/0327317 A1* | 11/2016 | Inoue | F25B 13/00 |

FOREIGN PATENT DOCUMENTS

| | | | | |
|---|---|---|---|---|
| JP | 2012098016 A | | 5/2012 | |
| JP | WO 2012096252 A1 * | | 7/2012 | ......... F28D 1/05375 |
| JP | 2013155966 A | | 8/2013 | |
| KR | 1020050079751 A | | 8/2005 | |
| KR | 20120103054 A | | 9/2012 | |
| KR | 1020140036756 A | | 3/2014 | |

\* cited by examiner

OUTDOOR HEAT EXCHANGER

CROSS-REFERENCE TO RELATED APPLICATIONS

This patent application is a United States national phase patent application based on PCT/KR2015/004390 filed Apr. 30, 2015 which claims the benefit of Korean Patent Application No. 10-2014-0059852 filed May 19, 2014. The entire disclosures of the above patent applications are hereby incorporated herein by reference.

TECHNICAL FIELD

The present invention relates to an outdoor heat exchanger, and more particularly, to a down flow type outdoor heat exchanger having channels of at least three paths in a heat pump system for vehicles, in which a flux distribution means protruded in a height direction is further formed in a lower tank in which the channel is changed from an upward direction to a downward direction or from a downward direction to an upward direction to block some area of a lower portion thereof so as to prevent a refrigerant from being non-uniformly distributed while a flux is concentrated toward a rear side thereof due to a fluid inertia in an area in which the flow path is changed, thereby delaying frosting upon heating.

BACKGROUND ART

Vehicles using an engine, which uses gasoline, diesel oil, and the like as an energy source, as a driving source are a general vehicle type. However, the vehicles increasingly require new energy sources due to various factors such as the environmental pollutions of the energy sources for vehicles and the reduction in oil deposits. At present, one of technologies which are the closest approach to commercialization drives vehicles using electricity as an energy source.

However, unlike the existing vehicles having an engine using petroleum as an energy source, electric vehicles may not use a heating system using cooling water. That is, the existing vehicles having the engine using petroleum as an energy source as a driving source have considerable heat generated from the engine, include a cooling water circulation system for cooling the engine, and allow the cooling water to use heat absorbed from the engine for indoor heating. However, since driving sources used in the electric vehicles do not generate heat as much as that generated from the engine, the electric vehicles have a limit of using the existing heating scheme.

Therefore, various researches for electric vehicles having a heat pump added to an air conditioning system and, using the heat pump as a heat source, or including a separate heat source such as an electric heater, or the like have been conducted.

Figure 1:
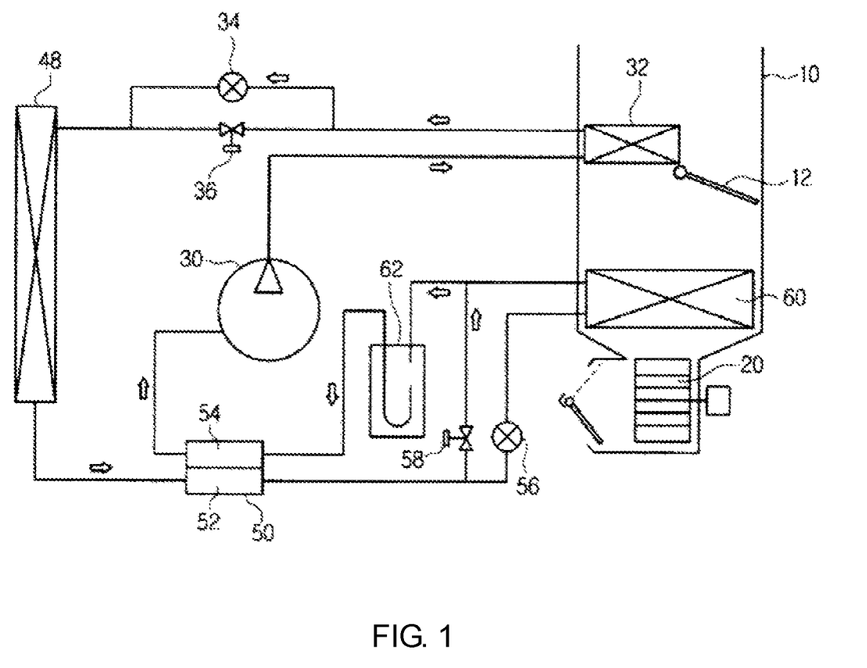
FIG. 1 is a configuration diagram illustrating a general heat pump system for vehicles.

As illustrated in FIG. 1, a heat pump system for vehicles is configured to include a compressor 30 compressing and discharging a refrigerant, a high pressure heat exchanger 32 radiating the refrigerant discharged from the compressor 30, a first expansion valve 34 and a first bypass valve 36 provided in a parallel structure to selectively pass the refrigerant passing through the high pressure heat exchanger 32, an outdoor machine 48 heat-exchanging the refrigerant passing through the first expansion valve 34 or the first bypass valve 36 outdoors, a low pressure heat exchanger 60 evaporating the refrigerant passing through the outdoor machine 48, an accumulator 62 separating the refrigerant passing through the low pressure heat exchanger 60 into a gaseous refrigerant and a liquefied refrigerant, an internal heat exchanger 50 exchanging heat between the refrigerant supplied to the low pressure heat exchanger 60 and the refrigerant returning to the compressor 30, a second expansion valve 56 selectively expanding the refrigerant supplied to the low pressure heat exchanger 60, and a second bypass valve 58 provided in parallel with the second expansion valve 56 to selectively connect an outlet side of the outdoor machine 48 to an inlet side of the accumulator 62.

In FIG. 1, reference numeral 10 represents an air conditioning case in which the high pressure heat exchanger 32 and the low pressure heat exchanger 60 are embedded, reference numeral 12 represents a temperature control door controlling a mixed amount of cold air with hot air, and reference numeral 20 represents a blower provided at the inlet of the air conditioning case.

According to the existing heat pump system for vehicles configured as described above, when a heat pump mode (heating mode) is operated, the first bypass valve 36 and the second expansion valve 56 are closed and the first expansion valve 34 and the second bypass valve 58 are opened. Further, the temperature control door 12 is operated as illustrated in FIG. 1.

Therefore, the refrigerant discharged from the compressor 30 sequentially passes through the high pressure heat exchanger 32, the first expansion valve 34, the outdoor heat exchanger 48, a high pressure part 52 of the internal heat exchanger 50, the second bypass valve 58, the accumulator 62, and a low pressure part 54 of the internal heat exchanger 50 and then returns to the compressor 30.

That is, the high pressure heat exchanger 32 serves as a heater and the outdoor machine 48 serves as an evaporator.

When an air conditioner mode (cooling mode) is operated, the first bypass valve 36 and the second expansion valve 56 are opened and the first expansion valve 34 and the second bypass valve 58 are closed. Further, the temperature control door 12 closes a passage of the high pressure heat exchanger 32.

Therefore, the refrigerant discharged from the compressor 30 sequentially passes through the high pressure heat exchanger 32, the first bypass valve 36, the outdoor heat exchanger 48, the high pressure part 52 of the internal heat exchanger 50, the second expansion valve 56, the low pressure heat exchanger 60, the accumulator 62, and the low pressure part 54 of the internal heat exchanger 50 and then returns to the compressor 30. That is, the low pressure heat exchanger 60 serves as the evaporator and the high pressure heat exchanger 32 closed by the temperature control door 12 serves as the heater like the heat pump mode.

As the related technology, Korean Patent Laid-Open Publication No. 10-2012-0103054 (Published on Sep. 19, 2012, Title: Heat Pump System For Vehicles) is disclosed.

Meanwhile, in the heating mode, surface temperature is rapidly reduced while the outdoor heat exchanger absorbs ambient heat in a state in which external temperature is low, and as a result moisture on the surface is frozen to generate frost and condensed water is discharged during a defrosting process of melting the frost.

The outdoor heat exchanger which is a cross flow type has a problem in that when fins/tubes are disposed, draining property of water melted during the defrosting process of melting frost is bad and thus the defrosting is not made well and the melted frost is re-frozen and thus the frosting occurs.

On the other hand, like the general evaporator for vehicles, the down flow type outdoor heat exchanger is formed to make the melted frost flow down, thereby making the draining property good and improving the efficiency of the defrosting mode of the heat pump.

Figure 2:
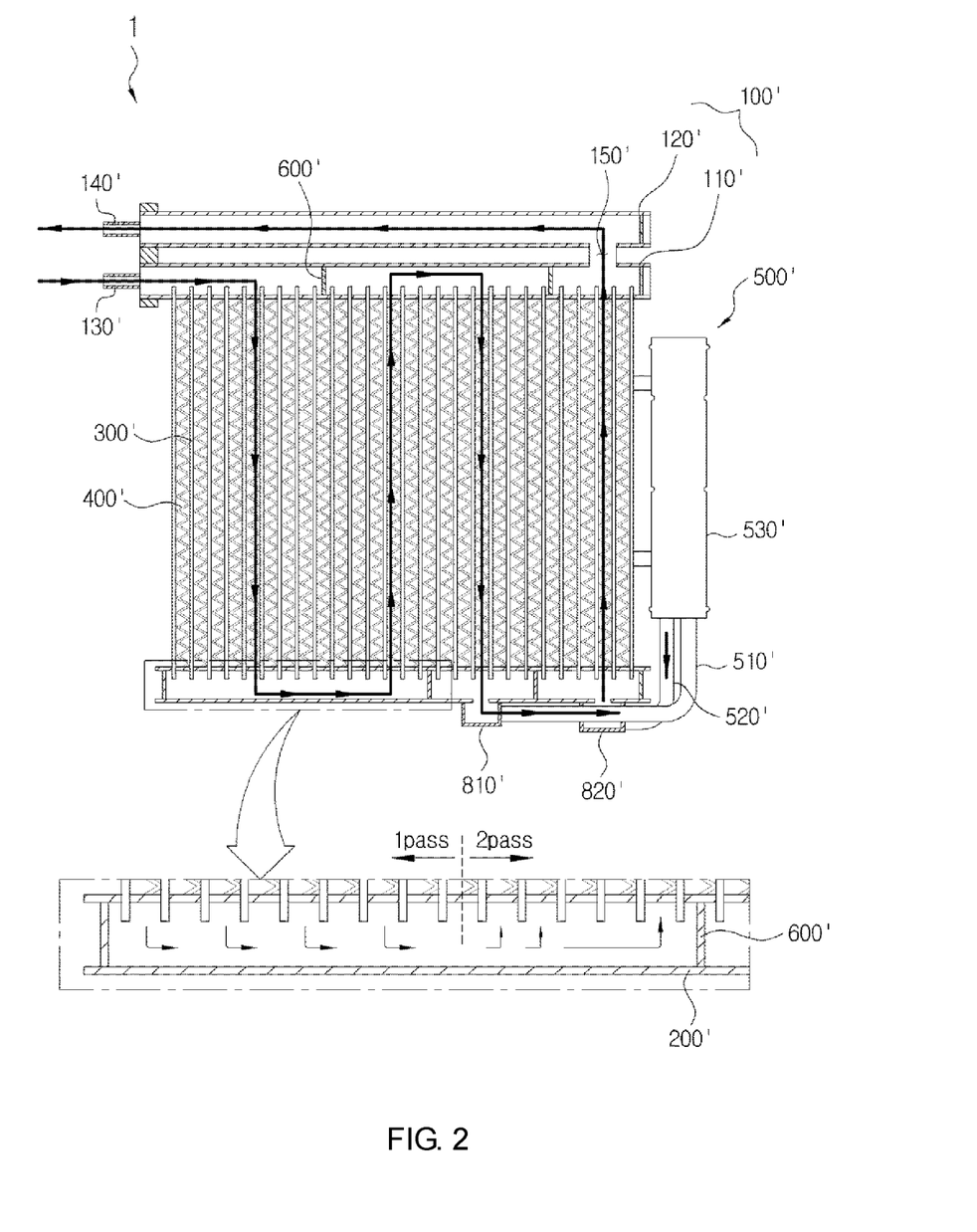
FIG. 2 is a cross-sectional front elevational view illustrating a flow of a refrigerant in an existing outdoor heat exchanger.

However, even in the down flow type outdoor heat exchanger, the frosting is generated, but as illustrated in FIG. 2, a refrigerant flux is small in some paths in which the channel is changed upon the heating mode and thus an area in which the frosting is not generated may be confirmed. The reason is that since the gaseous refrigerant is changed to the liquefied refrigerant upon the cooling mode but the liquefied refrigerant is changed to the gaseous refrigerant upon the heating mode, when the same path is used, a flux distribution of a refrigerant is non-uniform inside a core and thus a non-generation area F of frosting occurs.

Figure 3:
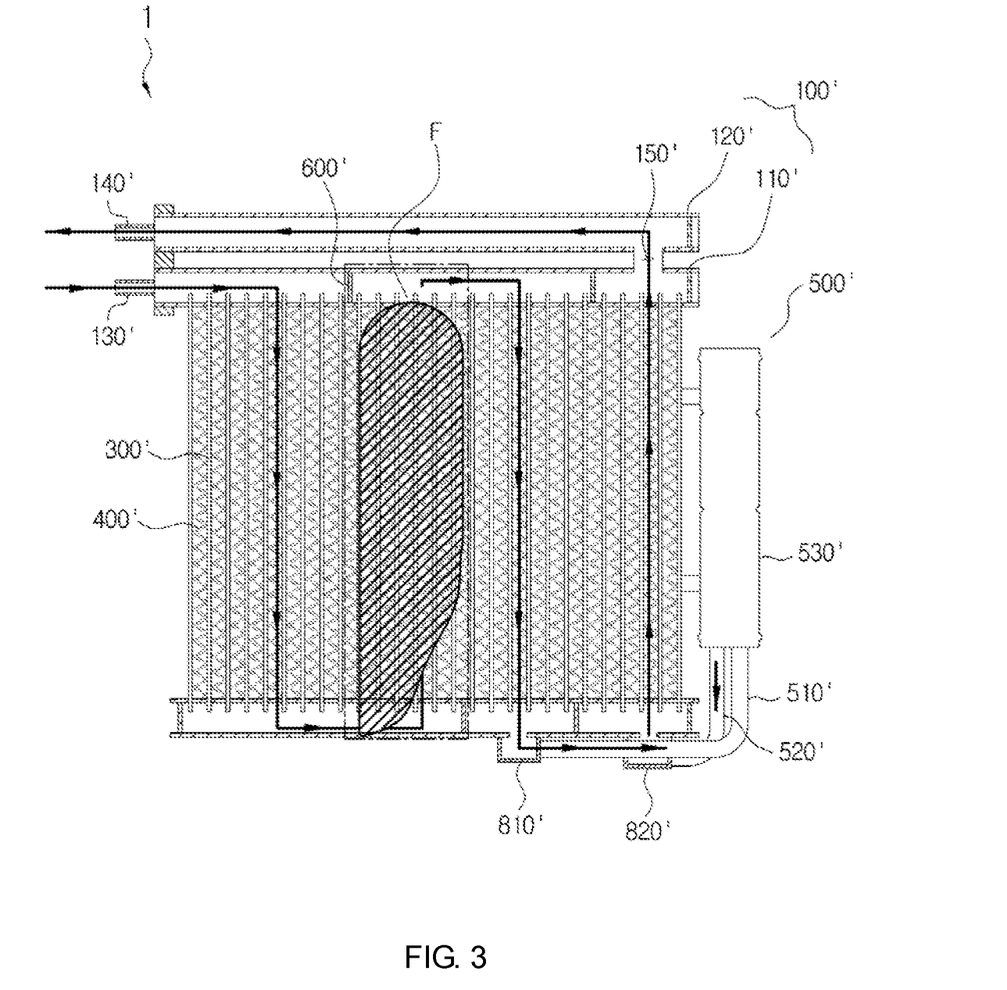
FIG. 3 is a cross-sectional front elevational view illustrating a non-generation area of frosting of the outdoor heat exchanger shown in FIG. 2.

A down flow type outdoor heat exchanger 1' illustrated in FIGS. 2-3 has four paths. Here, tubes 300' are distributed for each path so that the number of columns of the tubes 300' is gradually reduced from a first path toward a rear end.

Describing an outdoor heat exchanger having tubes of 81 columns in total, the tubes are distributed at a ratio of 30:24:15:12=1 path:2 path:3 path:4 path. In this case, as a frosting test result, it may be confirmed that the non-generation area of the frosting occurs approximately in an area of a latter part 18% of the 1 path and an area of a starting part 57% of the 2 path.

The frosting in the heat pump system is preferable to be maximally delayed and is more preferable to uniformly appear on the whole surface of the heat exchanger without being concentrated toward a specific portion of the surface in terms of performance.

Therefore, an outdoor heat exchanger for a heat pump capable of maximally delaying frosting needs to be developed.

SUMMARY OF THE INVENTION

An object of the present invention is to provide an outdoor heat exchanger capable of securing cooling performance upon cooling and delaying frosting upon heating by preventing a refrigerant from non-uniformly flowing in some area of the outdoor heat exchanger of a heat pump system for vehicles.

Technical Solution

In one general aspect, an outdoor heat exchanger 1 of a heat pump system for vehicles having a channel of at least three paths includes: an upper tank 100 and a lower tank 200 introduced with or discharging a refrigerant and provided in parallel with each other while being spaced apart from each other at a predetermined distance in a height direction; a plurality of tubes 300 having both ends fixed to the upper tank 100 and the lower tank 200 to form a channel of a refrigerant; a plurality of fins 400 interposed between the tubes 300; a liquid receiver 500 connected to the upper tank 100 or the lower tank 200; a baffle 600 provided in the upper tank 100 or the lower tank 200 to control a flow of the refrigerant; and a flux distribution means 700 provided in the lower tank 200 in which the channel is changed from an upward direction to a downward direction or from a downward direction to an upward direction and protruded in a height direction to block some area of a lower portion.

The flux distribution means 700 may be provided to be biased forward based on a central portion of an area of the lower tank 200 in which the tubes 300 corresponding to a 2 path are positioned.

The flux distribution means 700 may be a baffle 600 form and include a flow through hole 710 having some area of an upper portion opened in a height direction based on a central line.

The flux distribution means 700 may be inserted from an outside through an insertion groove formed on an outer wall surface of the lower tank 200.

The flux distribution means 700 may be formed by making an inner wall surface of some of the lower tank 200 protrude inwardly.

The flux distribution means 700 may be formed so that a height protruded toward an inner side of the lower tank 200 is equal to or lower than a central line in a height direction of the lower tank 200.

The upper tank 100 may include: an introduction tank 110 extending in a length direction and introduced with the refrigerant; a discharge tank 120 provided over the introduction tank 110 in a height direction while being parallel with the introduction tank 110 and communicating with the introduction tank 110 through a communicating path 150 to discharge the refrigerant; a first pipe 130 formed in the introduction tank 100 and introduced with the refrigerant; and a second pipe 140 formed in the discharge tank 120 and discharging the refrigerant.

The outdoor heat exchanger may further include: a channel of a 4 path so that the refrigerant introduced into the introduction tank 110 through the first pipe 130 moves between the lower tank 200 and the introduction tank 110 through the tube 300.

The liquid receiver 500 may include: a body 530 having an inside formed with a predetermined space; a first connection pipe 510 connected between an area of the lower tank 200 corresponding to a 3 path and a body 530 to guide the refrigerant to be introduced into the body; and a second connection pipe 520 connected between an area of the lower tank 200 corresponding to a 4 path and the body 530 to guide the refrigerant to be discharged from the body.

The outdoor heat exchanger may further include: a first pipe 130 through which the refrigerant is introduced into the upper tank 100; and a second pipe 140 through which the refrigerant is discharged to the lower tank 200.

The outdoor heat exchanger may further include: a channel of a 3 path or a 5 path so that the refrigerant introduced into the upper tank through the first pipe 130 moves between the upper tank 100 and the lower tank 200 through the tubes 300 and then is discharged through the second pipe 140.

When the channel of the refrigerant is the 3 path, the liquid receiver 500 may include a body 530, a first connection pipe 510 connected between an area of the upper tank 100 corresponding to a 2 path and the body 530 to guide the refrigerant to be introduced into the body, and a second connection pipe 520 connected between the area of the upper tank 100 corresponding to the 3 path and the body 530 to guide the refrigerant to be discharged from the body.

When the channel of the refrigerant is the 5 path, the liquid receiver 500 may include a body 530, a first connection pipe 510 connected between an area of the upper tank 100 corresponding to a 4 path and the body 530 to guide the refrigerant to be introduced into the body, and a second connection pipe 520 connected between the area of the upper tank 100 corresponding to the 5 path and the body 530 to guide the refrigerant to be discharged from the body.

The flux distribution means 700 may be each provided in the areas of the lower tank 200 in which the tubes 300 corresponding to the 2 path and the 4 path are provided.

Upon a cooling mode and a heating mode of the heat pump system for vehicles, the refrigerant may be introduced and discharged through the same channel.

Advantageous Effects

As set forth above, according to the exemplary embodiment of the present invention, the outdoor heat exchanger of the heat pump system for vehicles may prevent the refrigerant from non-uniformly flowing in some area to secure the cooling performance upon the cooling and delaying the frosting upon the heating.

Describing in more detail, to overcome the problem in that in the down flow type outdoor heat exchanger having the channel of at least three paths, the refrigerant is non-uniformly distributed while the flux is concentrated toward the rear side thereof due to the fluid inertia in the area in which the channel is changed from the upward direction to the downward direction or from the downward direction to the upward direction, some of the flux concentrated toward the rear side thereof may be distributed forward by the flux distribution means protruded in the height direction to block some area of the lower portion.

As a result, the exemplary embodiment of the present invention may prevent the frosting from being concentrated toward the specific portion of the whole surface, thereby maximally delaying the frosting and reducing the battery consumption of the EV vehicle to increase the driving distance.

Further, the exemplary embodiment of the present invention has the down flow type structure to make the melted water flow down during the defrosting process of melting the frost, thereby improving the efficiency of the defrosting mode upon the operation of the heat pump.

DETAILED DESCRIPTION OF EXEMPLARY EMBODIMENTS OF THE INVENTION

Hereinafter, an outdoor heat exchanger of a heat pump system for vehicles according to an exemplary embodiment of the present invention having the above-mentioned structure will be described in more detail with reference to the accompanying drawings.

Figure 4:
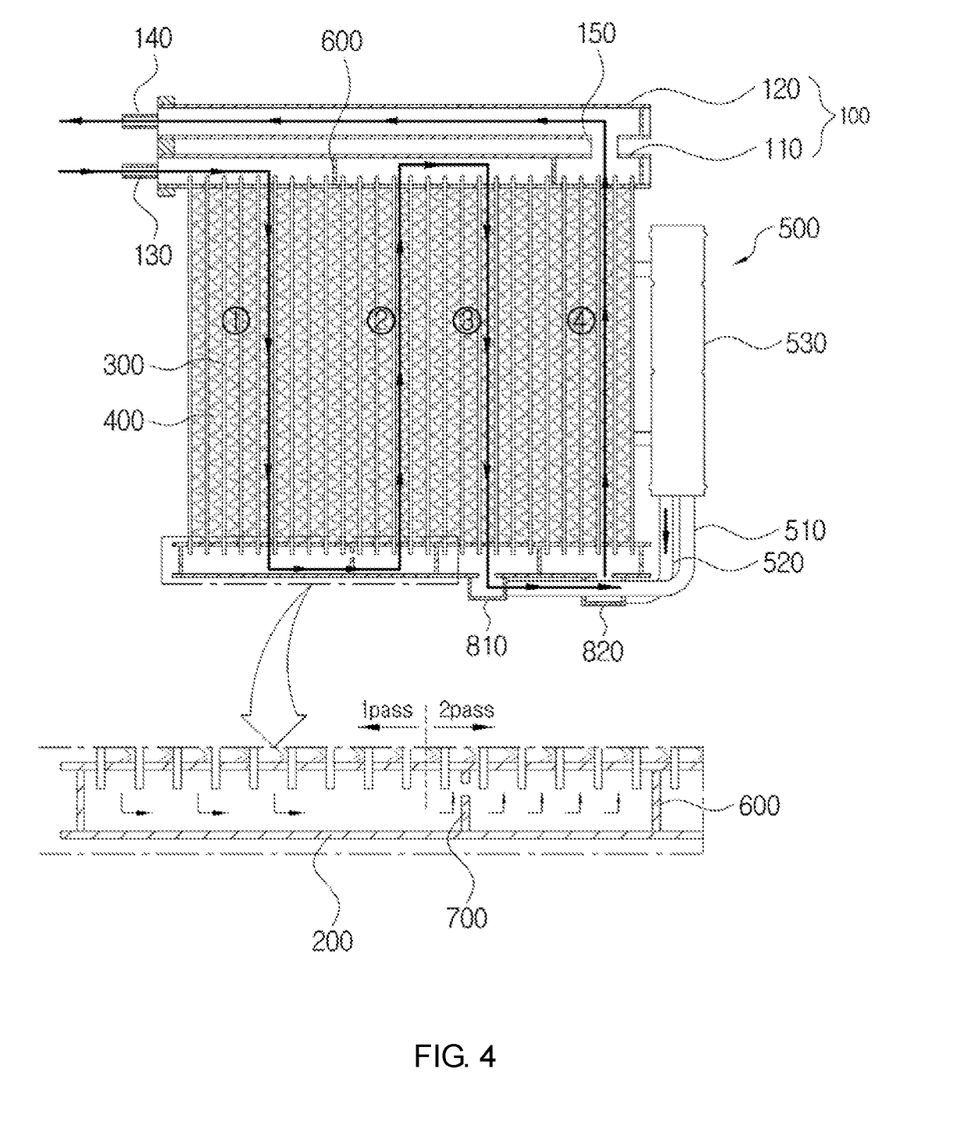
FIG. 4 is a cross-sectional front elevational view illustrating a flow of a refrigerant in an outdoor heat exchanger according to an exemplary embodiment of the present invention.
Figure 5:
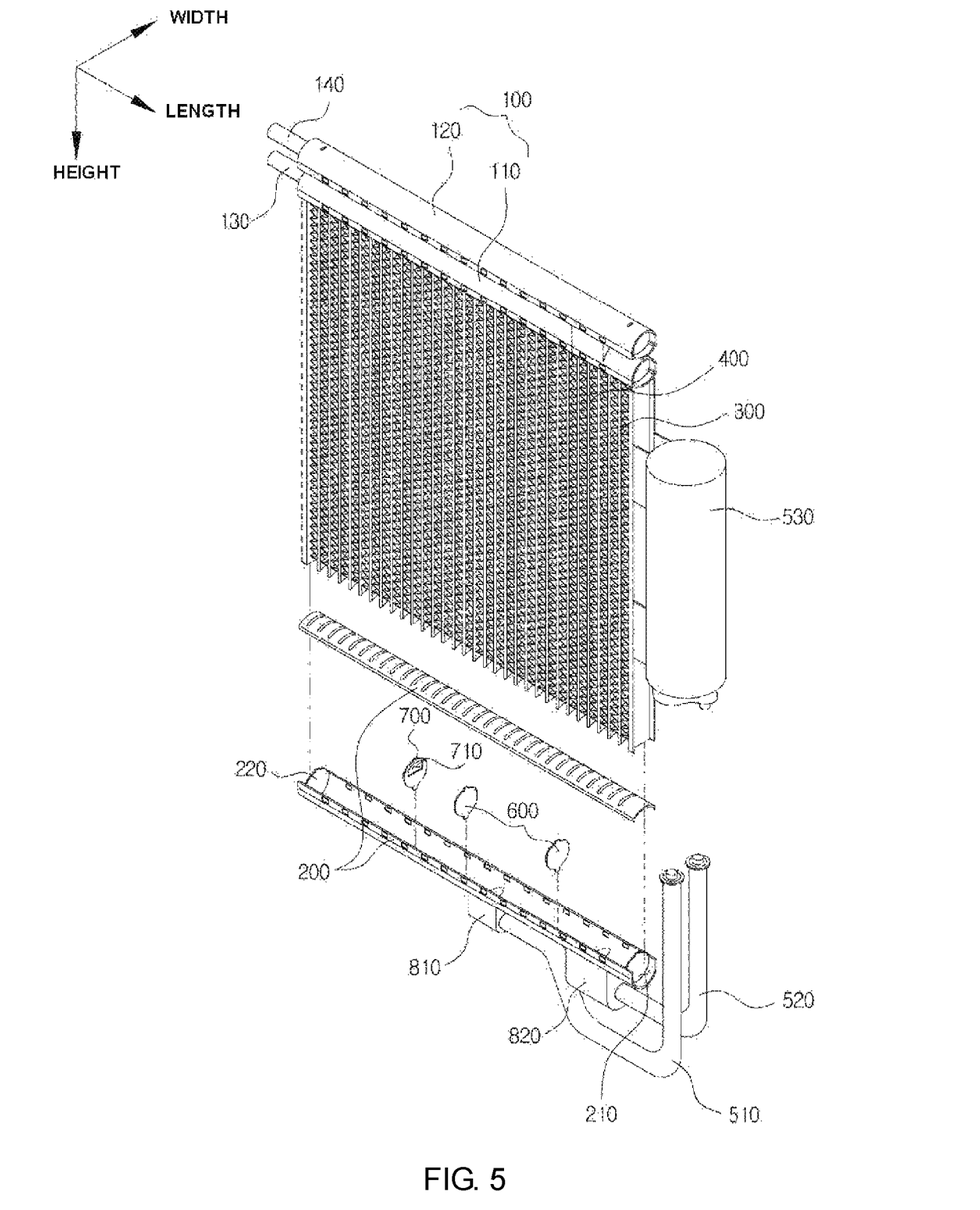
FIG. 5 is a partially exploded perspective view of a lower tank in the outdoor heat exchanger of FIG. 4 according to the exemplary embodiment of the present invention.

As illustrated in FIG. 4, an outdoor heat exchanger 1 according to an exemplary embodiment of the present invention serves as an evaporator upon a heating mode and a condenser upon a cooling mode in a heat pump system for vehicles, in which the existing condenser is formed in a down flow type and thus a refrigerant flows in a height direction.

The outdoor heat exchanger 1 according to the exemplary embodiment of the present invention is configured to largely include an upper tank 100, a lower tank 200, tubes 300, a liquid receiver 500, a baffle 600, and a flux distribution means 700 or a flux distribution plate.

The upper tank 100 and the lower tank 200 are formed to extend in a length direction and are provided in parallel with each other while being spaced apart from each other at a predetermined distance in a height direction, and thus the refrigerant are introduced into or discharged from the upper tank 100 and the lower tank 200.

The liquid receiver 500 may be configured to include a body 530 long extending in the height direction and having a predetermined space formed therein and a first connection pipe 510 connected between the upper tank 100 or the lower tank 200 and the body 530 to guide the refrigerant to be introduced into the body 530 or a second connection pipe 520 connected between the upper tank 100 or the lower tank 200 and the body 530 to guide the refrigerant to be discharged from the body 530.

The tube 300 has both ends fixed to the upper tank 100 and the lower tank 200 to form a channel of the refrigerant. Here, the plurality of tubes 300 are provided in parallel in a length direction and fins 400 are interposed between the tubes 300 to increase a heat transfer area.

In this case, the upper tank 100 and the lower tank 200 may be each configured in a pipe form and may also be configured to include a header to which both ends of the tube 300 are coupled and a tank coupled to the header.

The baffle 600 is provided in the upper tank 100 or the lower tank 200 to control the flow of the refrigerant.

Figure 8:
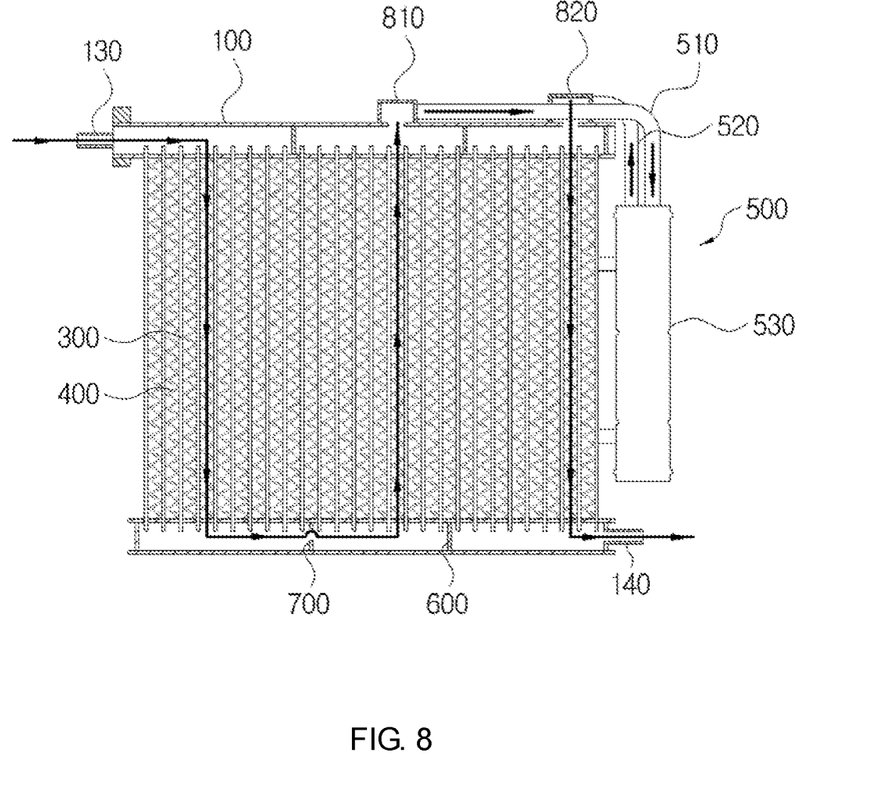
FIG. 8 is a cross-sectional front elevational view illustrating a flow of refrigerant through an outdoor heat exchanger according to another exemplary embodiment of present invention.
Figure 9:
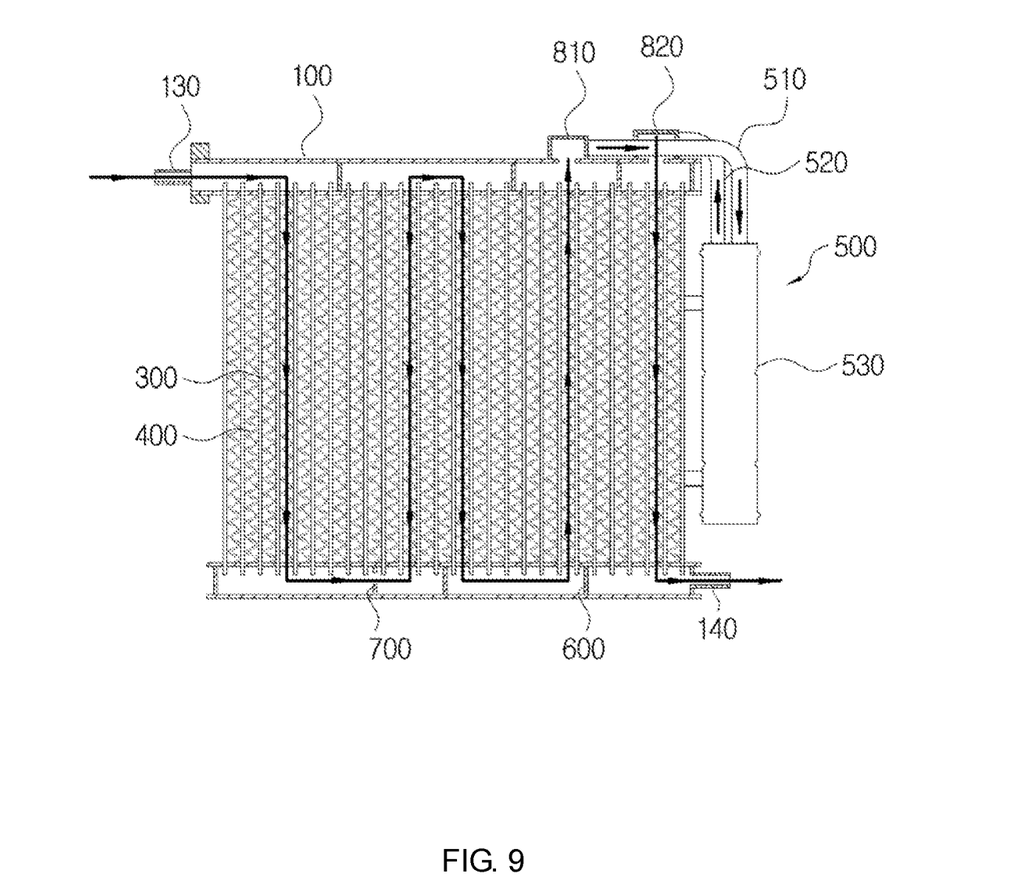
FIG. 9 is a cross-sectional front elevational view illustrating a flow of refrigerant through an outdoor heat exchanger according to another exemplary embodiment of the present invention.

The outdoor heat exchanger 1 according to the exemplary embodiment of the present invention is formed to have a channel of at least three paths. FIG. 4 illustrates an example in which the outdoor heat exchanger 1 has a channel of a 4 paths, FIG. 8 illustrates an example in which the outdoor heat exchanger 1 has a channel of a 3 paths, and FIG. 9 illustrates an example in which the outdoor heat exchanger 1 has a channel of 5 paths.

In this case, in the outdoor heat exchanger 1 according to the exemplary embodiment of the present invention, the liquid receiver 500 may be provided in the upper tank 100 or the lower tank 200 according to the path and the upper tank 100 may be formed by being divided into an introduction tank 110 into which the refrigerant is introduced and a discharge tank 120 from which the refrigerant is discharged.

Further, in the outdoor heat exchanger 1 according to the exemplary embodiment of the present invention, the introduction and discharge of the refrigerant are not made the other way around according to the cooling mode and the heating mode of the heat pump system for vehicles but the refrigerant is introduced and discharged through the same passage.

In particular, the outdoor heat exchanger 1 according to the exemplary embodiment of the present invention further includes the flux distribution means 700 which is provided in the lower tank 200 in which the channel is changed from an upward direction to a downward direction or from a downward direction to an upward direction and is protruded in a height direction to block some area of a lower portion, thereby improving the problem in that the refrigerant is non-uniformly distributed while a flux is concentrated toward a rear side thereof due to a fluid inertia in an area in which the channel is changed.

In this case, the flux distribution means 700 is provided to be biased forward of the channel based on a center in a length direction of an area in which the refrigerant flows downward along a first path and then rises to a second path in the lower tank 200, that is, the area of the lower tank 200 in which the tube 300 corresponding to the second path is positioned, thereby blocking some of the flux concentrated toward the rear side thereof to guide the flux to the tube 300 positioned in the front of the channel.

Figure 6:
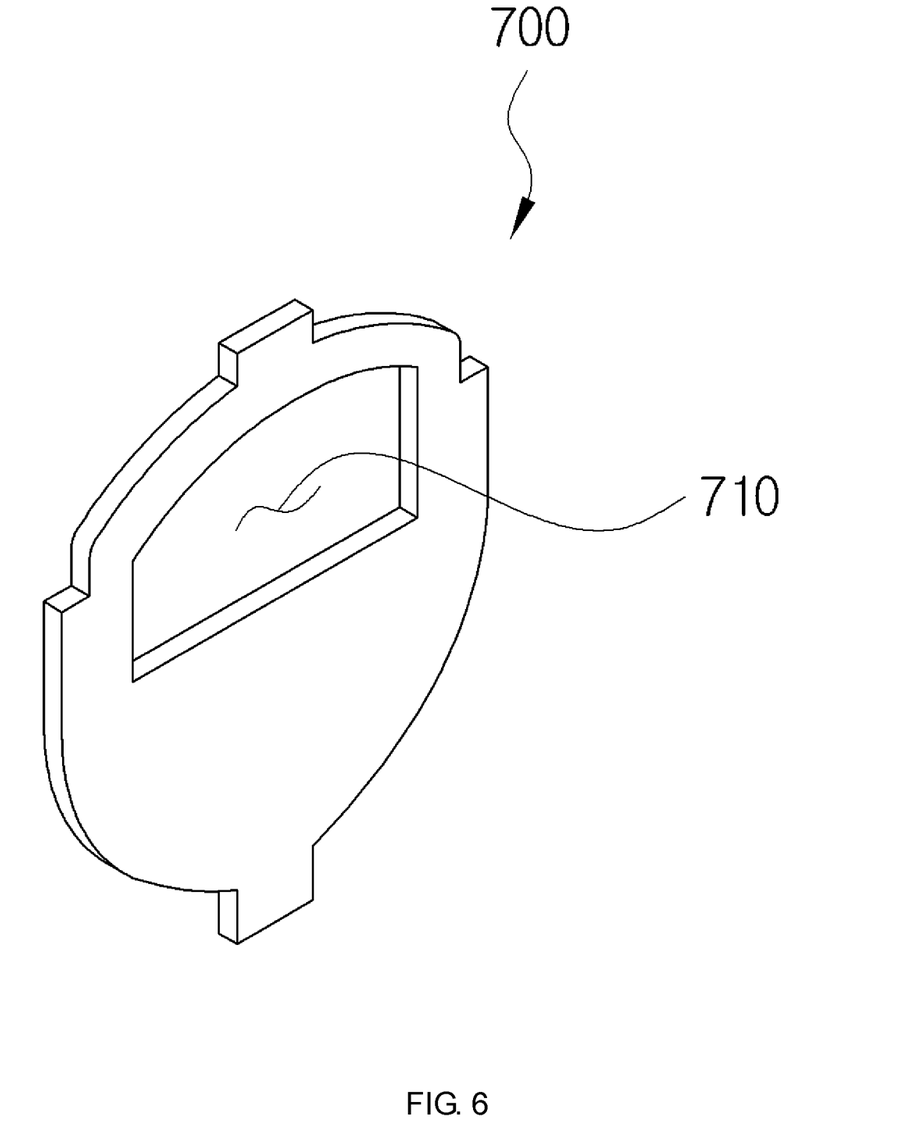
FIG. 6 is a perspective view of a flux distribution means of the outdoor heat exchanger of FIGS. 4-5 according to the exemplary embodiment of the present invention.

As illustrated in FIG. 6, the flux distribution means 700 is formed in a baffle form and is configured to include a flow through hole 710 having some area of an upper portion opened in a height direction based on a central line to block some of the flux concentrated toward the rear side thereof due to a closed portion of a lower portion thereof, and as a result the refrigerant is guided to flow forward and the refrigerant of which the velocity of flow is slow flows through the flow through hole 710, thereby uniformly distributing the flux.

In this case, similar to the baffle 600, the flux distribution means 700 may be mounted by an insertion method from an outside through an insertion groove 210 formed on an outer wall surface of the lower tank 200.

Figure 7:
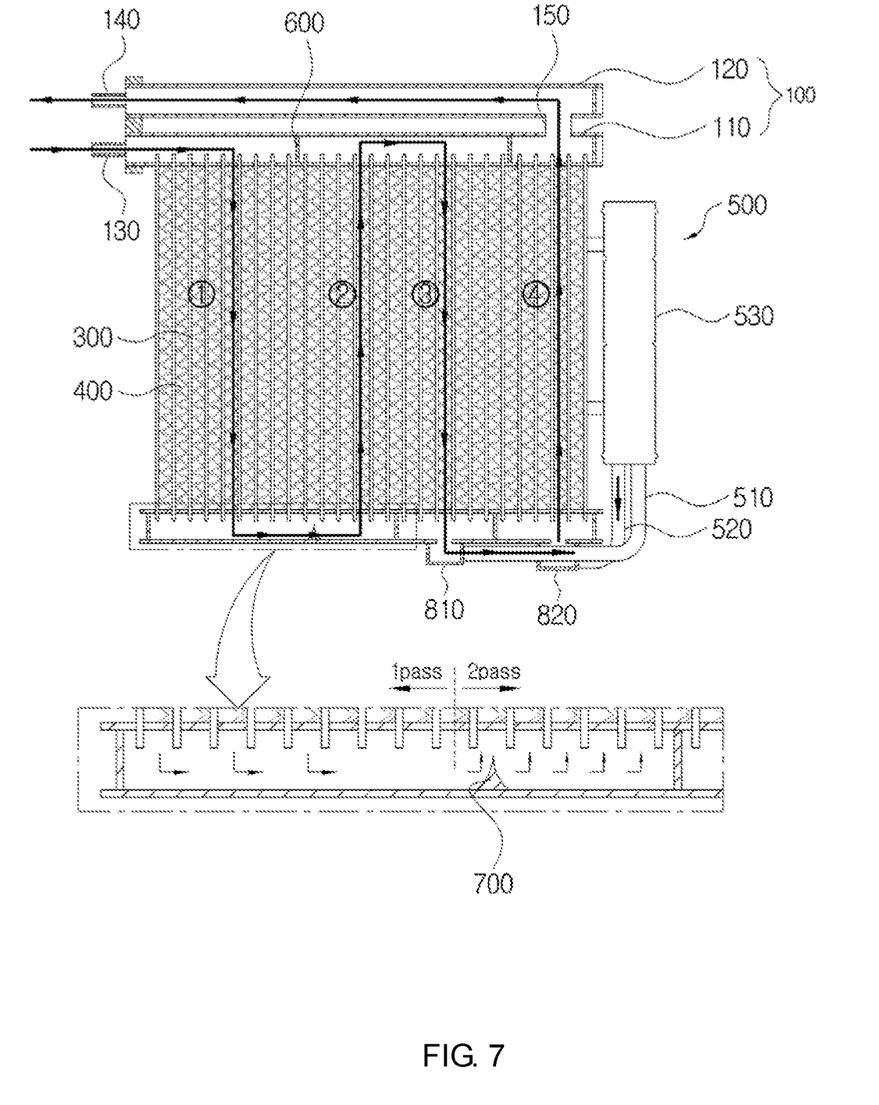
FIG. 7 is a cross-sectional front elevational view illustrating the flow of refrigerant through the outdoor heat exchanger of FIGS. 4-5 according to the exemplary embodiment of the present invention.

According to another exemplary embodiment of the present invention, as illustrated in FIG. 7, the flux distribution means 700 may also be formed by making some of an inner wall surface of the lower tank 200 protrude inwardly.

In this case, the flux distribution means 700 may be formed so that the protruded height does not cross over the central line in the height direction of the lower tank 200.

Again describing the outdoor heat exchanger 1 according to the exemplary embodiment of the present invention with reference to FIG. 4, in the outdoor heat exchanger 1, the upper tank 100 includes the introduction tank 110 extending in the length direction and introduced with the refrigerant, the discharge tank 120 installed over the introduction tank 110 in the height direction while being parallel with the introduction tank 110 from which the refrigerant is discharged, a first pipe 130 formed in the introduction tank 100 and introduced with the refrigerant; and a second pipe 140 formed in the discharge tank 120 and discharging the refrigerant and has a channel of 4 paths so that the liquid receiver 500 and the lower tank 200 are connected to each other.

In this case, in the liquid receiver 500, the first connection pipe 510 may be connected between the area of the lower tank 200 corresponding to a third path and the body 530 and the second connection pipe 520 may be connected between the area of the lower tank 200 corresponding to a fourth path and the body 530.

In this case, the flux distribution means 700 is mounted to be biased forward within the lower tank 200 to which the tube 300 corresponding to the second path is connected and the baffle 600 is provided between the first path and the second path, in the upper tank 100 between the third path and the fourth path, between the second path and the third path in the lower tank 200, and between the third path and the fourth path in the lower tank 200.

Therefore, the refrigerant in the outdoor heat exchanger 1 of FIG. 4 is introduced into the introduction tank 110 through the first pipe 130 and then flows downward along the tube 300 of the first path. In this case, the refrigerant moves upward while being uniformly distributed to the tube 300 corresponding to the second path by the flux distribution means 700.

Next, the refrigerant passes through the introduction tank 110 and then again flows to the lower tank 200 of the lower portion along the tube 300 of the third path and then is discharged to the second connection pipe 520 via the liquid receiver 500 through the first connection pipe 510.

The refrigerant discharged from the liquid receiver 500 rises to the introduction tank 110 along the tube 300 of the fourth path and then is discharged to the second pipe 140 along the discharge tank 120 through a communicating path 150 connected to the discharge tank 120.

The outdoor heat exchanger 1 illustrated in FIGS. 8 and 9 includes the first pipe 130 through which the refrigerant is introduced into the upper tank 100, the second pipe 140 through which the refrigerant is discharged from the lower tank 200, and has the channel of the third path or the fifth path so that the liquid receiver 500 is connected to the upper tank 100.

The refrigerant in the outdoor heat exchanger 1 of FIG. 8 is introduced into the upper tank 100 through the first pipe 130 and then flows downward along the tube 300 of the first path. In this case, the refrigerant moves upward while being uniformly distributed to the tube 300 corresponding to the second path by the flux distribution means 700.

Next, the refrigerant is introduced into the liquid receiver 500 through the first connection pipe 510 connected to the upper tank 100 and then discharged through the second connection pipe 530 and thus flows downward along the tube 300 of the third path to be discharged to the second pipe 140.

In this case, the liquid receiver 500 may have the first connection pipe 510 connected between the area of the upper tank 100 corresponding to the second path and the body 530 to guide the refrigerant to be introduced into the body 530, and the second connection pipe 520 connected between the area of the upper tank 100 corresponding to the third path and the body 530 to guide the refrigerant to be discharged from the body 530.

The refrigerant in the outdoor heat exchanger 1 of FIG. 9 is introduced into the upper tank 100 through the first pipe 130 and then flows downward along the tube 300 of the 1 path. In this case, the refrigerant moves upward while being uniformly distributed to the tube 300 corresponding to the second path by the flux distribution means 700.

Next, the refrigerant passes through the upper tank 100 and flows to the lower tank 200 through the tube 300 of the third path. In this case, the refrigerant is uniformly distributed into the tube 300 corresponding to the fourth path by another flux distribution means 700 to flow upward.

Next, the refrigerant is introduced into the liquid receiver 500 through the first connection pipe 510 connected to the upper tank 100 and then discharged through the second connection pipe 520 and thus flows downward along the tube 300 of the fifth path to be discharged to the second pipe 140.

In this case, in the liquid receiver 500, the first connection pipe 510 may be connected between the area of the upper tank 100 corresponding to the 4 path and the body 530 and the second connection pipe 520 may be connected between the area of the upper tank 100 corresponding to the 5 path and the body 530.

As a result, in the down flow type outdoor heat exchanger 1 having the channel of at least three paths according to the exemplary embodiment of the present invention, it is possible to improve the problem in that the refrigerant is non-uniformly distributed while the flux is concentrated toward the rear side due to the fluid inertia in the area in which the channel is changed from the upward direction to the downward direction or from the downward direction to the upward direction.

Further, the exemplary embodiment of the present invention may prevent the frosting from being concentrated toward the specific portion of the whole surface, thereby maximally delaying the frosting and reducing the battery consumption of the EV vehicle to increase the driving distance.

The present invention is not limited to the above-mentioned embodiments but may be variously applied, and may be variously modified by those skilled in the art to which the present invention pertains without departing from the gist of the present invention claimed in the claims.

The invention claimed is:

1. An outdoor heat exchanger comprising:
   a first tank introducing a refrigerant to the outdoor heat exchanger;
   a second tank spaced from the first tank;
   a plurality of tubes extending longitudinally in a height direction of the outdoor heat exchanger, the plurality of tubes extending between and in fluid communication with the first tank and the second tank, the plurality of tubes cooperating with the first tank and the second tank to form a flow path through the outdoor heat exchanger, wherein the flow path includes a first path through the plurality of tubes and a second path through the plurality of tubes, the first path conveying the refrigerant from the first tank to the second tank and the second path conveying the refrigerant from the second tank to the first tank;
   a plurality of fins interposed between adjacent ones of the plurality of tubes;
   a liquid receiver coupled to one of the first tank and the second tank;
   a first baffle disposed in the first tank, the first baffle guiding the refrigerant to flow along the first path;
   a second baffle disposed in the second tank, the second baffle guiding the refrigerant to flow along the second path; and
   a flux distribution plate disposed in the second tank, the flux distribution plate minimizing a cross-sectional flow area for the refrigerant flowing through the second tank, wherein the flux distribution plate has a shape corresponding to a cross-sectional shape of the second tank, wherein the flux distribution plate has a flow through hole formed in an upper portion thereof with respect to the height direction, wherein the flux distribution plate is disposed in a portion of the second tank corresponding to the second path, wherein a central plane divides the second tank equally into an upper portion disposed above the central plane with respect to the height direction and a lower portion disposed below the central plane with respect to the height direction, and wherein a bottommost surface of the flux distribution plate defining the flow through hole thereof is disposed above the central plane of the second tank with respect to the height direction, wherein the flux distribution plate is positioned intermediate the first baffle and the second baffle with respect to a length direction of the outdoor heat exchanger, wherein the flux distribution plate guides a first portion of the refrigerant flowing from the first path to flow along the second path and a remaining second portion of the refrigerant flowing from the first path flows through the flow through hole, and wherein the second baffle guides the remaining second portion of the refrigerant to flow along the second path.

2. The outdoor heat exchanger of claim 1, wherein the flux distribution plate is inserted into the second tank through an insertion groove formed in the second tank.

3. The outdoor heat exchanger of claim 1, wherein the first tank includes:
   an introduction tank extending in a length direction with respect to a length of the outdoor heat exchanger, the introduction tank introducing the refrigerant to the outdoor heat exchanger; and
   a discharge tank disposed parallel to the introduction tank and discharging the refrigerant from the outdoor heat exchanger, the introduction tank disposed intermediate the discharge tank and the plurality of tubes.

4. The outdoor heat exchanger of claim 3, wherein the flow path includes the first path, the second path, a third path, and a fourth path, and wherein the first path extends from a first refrigerant flow portion of the introduction tank to a first refrigerant flow portion of the second tank, the second path extends from the first refrigerant flow portion of the second tank to a second refrigerant flow portion of the introduction tank, the third path extends from the second refrigerant flow portion of the introduction tank to a second refrigerant flow portion of the second tank, and the fourth path extends from a third refrigerant flow portion of the second tank to a third refrigerant flow portion of the introduction tank.

5. The outdoor heat exchanger of claim 4, wherein the liquid receiver includes:
   a body having a predetermined internal space formed therein;
   a first connection pipe providing fluid communication between the second refrigerant flow portion of the second tank to the body; and
   a second fluid connection pipe providing fluid communication between the body and the third refrigerant flow portion of the second tank, and wherein the refrigerant is conveyed consecutively through the first refrigerant flow portion of the introduction tank, the first path, the first refrigerant flow portion of the second tank, the second path, the second refrigerant flow portion of the introduction tank, the third path, the second refrigerant flow portion of the second tank, the first connection pipe, the body, the second connection pipe, the third refrigerant flow portion of the second tank, the fourth path, the third refrigerant flow portion of the introduction tank, and the discharge tank.

6. The outdoor heat exchanger of claim 1, further comprising a first pipe coupled to the first tank and a second pipe coupled to the second tank, the first pipe introducing refrigerant to the first tank and the second pipe discharging refrigerant from the second tank.

7. The outdoor heat exchanger of claim 6, wherein the flow path includes the first path, the second path, and a third path, the first path extending from a first refrigerant flow portion of the first tank to a first refrigerant flow portion of the second tank, the second path extending from the first refrigerant flow portion of the second tank to a second refrigerant flow portion of the first tank, the third path extending from a third refrigerant flow portion of the first tank to a second refrigerant flow portion of the second tank.

8. The outdoor heat exchanger of claim 7, wherein the liquid receiver includes:
  a body having a predetermined internal space formed therein;
  a first connection pipe providing fluid communication between the second portion of the first tank to the body; and
  a second fluid connection pipe providing fluid communication between the body and the third refrigerant flow portion of the first tank, and wherein the refrigerant is conveyed consecutively through the first pipe, the first refrigerant flow portion of the first tank, the first path, the first refrigerant flow portion of the second tank, the second path, the second refrigerant flow portion of the first tank, the first connection pipe, the body, the second connection pipe, the third refrigerant flow portion of the first tank, the third path, the second refrigerant flow portion of the second tank, and the second pipe.

9. The outdoor heat exchanger of claim 6, wherein the flow path includes the first path, the second path, a third path, a fourth path, and a fifth path, the first path extending from a first refrigerant flow portion of the first tank to a first refrigerant flow portion of the second tank, the second path extending from the first refrigerant flow portion of the second tank to a second refrigerant flow portion of the first tank, the third path extending from the second refrigerant flow portion of the first tank to a second refrigerant flow portion of the second tank, the fourth path extending from the second refrigerant flow portion of the second tank to a third refrigerant flow portion of the first tank, the fifth path extending from a fourth refrigerant flow portion of the first tank to a third refrigerant flow portion of the second tank.

10. The outdoor heat exchanger of claim 9, wherein the liquid receiver includes:
  a body having a predetermined internal space formed therein;
  a first connection pipe providing fluid communication between the third refrigerant flow portion of the first tank to the body; and
  a second fluid connection pipe providing fluid communication between the body and the fourth refrigerant flow portion of the first tank, and wherein the refrigerant is conveyed consecutively through the first pipe, the first refrigerant flow portion of the first tank, the first path, the first refrigerant flow portion of the second tank, the second path, the second refrigerant flow portion of the first tank, the third path, the second refrigerant flow portion of the second tank, the fourth path, the first connection pipe, the body, the second connection pipe, the fourth refrigerant flow portion of the first tank, the fifth path, the third refrigerant flow portion of the second tank, and the second pipe.

11. The outdoor heat exchanger of claim 1, wherein the outdoor heat exchanger is configured to operate in a cooling mode and a heating mode, and wherein the refrigerant is introduced to and discharged from the flow path in the cooling mode and the heating mode.

12. The outdoor heat exchanger of claim 1, wherein the flow through hole is formed in the flux distribution plate in only the area of the flux distribution plate higher than the central line of the second tank in the height direction.

13. The outdoor heat exchanger of claim 1, wherein an area of the flux distribution plate lower than the central line of the second tank in the height direction is entirely closed to facilitate uniformly distributing the refrigerant flowing through the heat exchanger.

14. The outdoor heat exchanger of claim 1, wherein an end of each of the plurality of tubes is disposed within the upper portion of the second tank.

15. The outdoor heat exchanger of claim 1, wherein the flux distribution plate is disposed in the second tank adjacent a boundary between a first plurality of the tubes forming the first path and a second plurality of the tubes forming the second path.

16. The outdoor heat exchanger of claim 1, wherein the flux distribution plate is disposed intermediate a pair of the tubes forming a portion of the second path, wherein the pair of the tubes is disposed adjacent one of the tubes forming the first path.

17. The outdoor heat exchanger of claim 1, wherein the flux distribution plate is biased towards an end of the portion of the second tank corresponding to the second path.

* * * * *